United States Patent
Egawa et al.

[11] Patent Number: 5,889,642
[45] Date of Patent: Mar. 30, 1999

[54] MAGNETIC HEAD

[75] Inventors: Motoji Egawa; Kazutoshi Takayanagi, both of Asaba-cho, Japan

[73] Assignee: Minebea Co., Ltd., Miyota, Japan

[21] Appl. No.: 889,887

[22] Filed: Jul. 10, 1997

[30] Foreign Application Priority Data

Nov. 22, 1996 [JP] Japan ..................... 8-327557

[51] Int. Cl.$^6$ ............... G11B 5/105; G11B 5/265
[52] U.S. Cl. .................. 360/125; 360/104; 360/129
[58] Field of Search .................... 360/122, 123, 360/125, 126, 128, 129, 104, 109

[56] References Cited

U.S. PATENT DOCUMENTS

| | | | |
|---|---|---|---|
| 5,148,342 | 9/1992 | Kato | 360/121 |
| 5,457,871 | 10/1995 | Wakasugi et al. | 360/122 |
| 5,459,629 | 10/1995 | Wakasugi | 360/104 |

FOREIGN PATENT DOCUMENTS

| | | | |
|---|---|---|---|
| 3-245309 | 10/1991 | Japan | 360/125 |
| 5-135323 | 6/1993 | Japan | 360/125 |

*Primary Examiner*—David L. Ometz
*Attorney, Agent, or Firm*—Oliff & Berridge, PLC

[57] ABSTRACT

A magnetic head includes a slider including rail portions for sliding on a magnetic medium. One rail portion includes inner side walls which define a rectangular hole, and a head core body having magnetic gaps is sealed in the hole with a sealing agent. Projections are formed on the inner side walls to enable proper core positioning in the hole. Multiple projections can be formed on the respective side walls. The projections can have different heights and also be spaced from the head core body in the hole. The projections can include first projections having a height $H_1$ and second projections having a height $H_2$ that satisfy the equation $1.2 \times H_1 \leq H_2 \leq 5.0\ H_1$. Also, the relative heights of the first and second projections can be related by the inequality, $H_2 - H_1 > C - w$, in which C is the spacing between projections on opposed inner side walls, and w is the width of the head core body in a direction between the opposed inner side walls.

9 Claims, 10 Drawing Sheets

F I G . 2
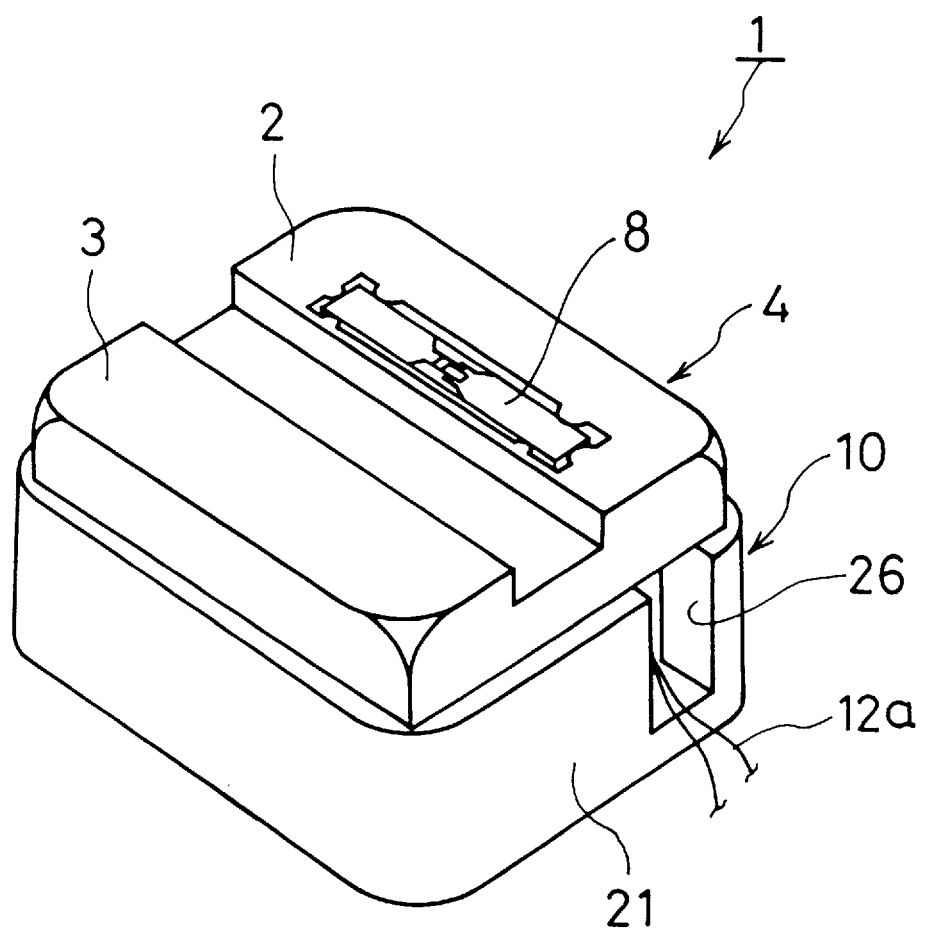

MAGNETIC HEAD

BACKGROUND OF THE INVENTION

Field of the Invention

The present invention relates to a magnetic head for use of a floppy disc drive(FDD) and a hard disc drive(HDD).

Related Art

One example of a conventional magnetic head for HDD is illustrated in FIGS. 5–7. In FIG. 5, a magnetic head 1 is comprised of in general an approximately rectangular slider 4, on one side of which rail portions 2, 3 (hereinafter referred as "the first rail and the second rail" respectively) are provided to slide on a magnetic medium (not shown), an approximately rectangular hole 5 formed on the first rail 2 of the slider 4, a front core 8 to be inserted in the hole 5, sealed with such as glass and provided with magnetic gaps (a read/write gap 6 and an erasing gap 7), a back yoke 10 made of magnetic material, which contacts to the front core (a head core body) 8 and forms a head core 9, and read/write coil 11 and erasing coil 12 which are mounted on the later-described leg portions of the back yoke 10.

Between the first rail 2 and the second rail 3, a groove 13 which is positioned on a level lower than the level of these first and second rails 2 and 3 is formed.

The front core 8, as shown in FIG. 7, is formed in general with a first core member 14 having a read/write gap 6 on one side of the member 14 and a second core member 15 having a side core 17 connected to the first core member 14, which is approximately figure rectangular in order to be inserted in the rectangular hole 5.

The first core member 14 is formed in general with a first center core 16 being made of magnetic material and elongating to the other side of the front core 8 and the magnetic material-made side core 17 for reading and writing and positioned on the front side.

The second core member 15 is formed in general with a second magnetic material-made center core 18 to be elongated to the other side of the front core 8 and connected to the first center core 16 and the magnetic material-made side core 19 for erasing use, being positioned on the front side and elongating to the other side of the front core 8 connected to the second center core 18 through an erasing gap 7. The second core member 15 is positioned to the same height level as the first core member 14. And, in the figures, 20 is glass which provides magnetic insulating and connection.

The back yoke 10, as shown in FIG. 5, is formed in general with an annular and approximately rectangular closed body 21, a stepped portion 22 which is extended corresponding to the opening side of the closed body 21 and provided on the bottom of the closed body 21, and first, second and third leg portions 23, 24 and 25 which are standing at the edge portion of the stepped portion 22.

The first leg portion 23 is coupled with the read/write coil 11, the third leg portion 25 is coupled with the erasing coil 12.

And, the first and third leg portions 23 and 25 are connected to the read/write side core 17 and the erasing side core 19 (FIG. 7) which are positioned on the front side, and the second leg portion 24 is connected to the first center core 16 and the second center core 18, and as shown in FIG. 6 the front core 8 and the back yoke 10 are unified, thereby the head core 9 is formed with the first, second and third leg portions 23, 24 and 25, the back yoke 10 including the stepped portion 22 and the front core 8.

A first side wall portion 21a and a second side wall portion 21b which are located on the line along which the first, second and third leg portions 23, 24 and 25 are disposed are provided with cut outs 26, 26, and lead wires 11a and 12a for the read/write coil 11 and an erasing coil 12 are adapted to be drawn out.

Further, perpendicular to the first side wall portion 21a, and second side wall portion 21b, a third side wall portion 21c and a fourth side wall portion 21d are formed. On the third side wall portion 21c, first, second and third ribs 27, 28 and 29 are formed in such a manner that these ribs correspond to the first, second and third leg portions 23, 24 and 25 respectively.

In this magnetic head, the front core 8 forming a part of the head core 9 is inserted in the hole 5 to seal the front core 8 to the slider 4, and molten glass is poured between the front core and the slider 4 avoiding any void from being generated. It also prevents matter such as dusts from being entered between such voids, thereby it is prevents the property from being deteriorated.

By the way, in the above mentioned conventional art, prior to the entering of the front core 8 into the slider 4, the slider 4 is adapted to be sintered, but by this sintering, as shown in FIG. 8, there have been generated such deformation in one of the inner walls of the hole 5 which are positioned on the long side of the central portion thereof causes to make the hole 5 larger or, to the contrary to the illustration as shown in FIG. 8, such deformation of the central portion thereof is projected inside of the hole 5 to make the hole 5 smaller.

Thereby, when the front core 8 is inserted in the hole 5 and the hole 5 is filled with glass, the front core 8 moves freely in the hole 5 and it is difficult to fix the front core at a given position.

As another conventional example, there is a magnetic head 1 which comprises, as shown in FIG. 9, four inner walls 30a, 30b, 30c and 30d forming the hole 5 (hereinafter referred as "first, second, third and fourth inner wall respectively), on the center of the first inner wall 30a, a stripe of projection (hereinafter referred as "first projection") 31a extending in a longitudinal direction of the hole 5 (in the direction perpendicular to the paper of FIG. 9) is formed and on the second inner wall 30b two stripes of projections (hereinafter referred as "the second projection") 31b, are formed the height of which is the same as the first projection. In this case, the sectional view of the first and second projections 31a, 31b show these being round and taller at the center portions thereof.

In the magnetic head 1 of FIG. 9, when glass is poured into the hole 5, between the first inner wall 30a and the second inner wall 30b on which the first projection 31a and the second projection 31b are formed and the front core 8, compared with the plain sides of the third inner wall 30c and the fourth inner wall 30d, excessive amount of glass flows toward the third inner wall 30c and the fourth inner wall 30d, and due to the difference of the surface tension of the blowed glass, the head core 9 tends to be displaced as being attracted toward the third inner wall 30c and the fourth inner wall 30d and thereby the position of the front core 8 is determined.

However, since the difference of the size of a gap $G_{3\ 4}$ between the third and fourth inner walls 30c, 30d and the front core 8, and the size of a $G_{1\ 2}$ between the first and second inner walls 30a, 30b and the front core 8 becomes large, each amount of the glass blowed in the two gaps $G_3$ $_4$, $G_{1\ 2}$ does not become even with each other.

That is, if the viscosity of the glass is smaller than the most preferable one, the molten glass is apt to flow excessively in the gap $G_{1\,2}$ which is formed between the first and second inner walls 30a, 30b and the front case 8 and larger than $G_{3\,4}$, and it is threatened to be blowed away.

To the contrary, if it is larger, the molten glass does not flow suitably in the gap $G_{3\,4}$, which is formed between the third and fourth inner walls 30c, 30d and the front core 8, and smaller than $G_{1\,2}$.

And, in order to solve the above problem which the magnetic head 1 of FIG. 9 has, it can be conceived that, as shown in FIG. 10, corresponding to one projection (the first projection 31a) of the first inner wall 30a and two projections (the second projection 31b) of the second inner wall 30b, on the third and the fourth inner walls 30c, 30d respectively also, one projection (the third projection 31c) and two projections (the fourth projection 31d) are provided to form the magnetic head 1. And, according to the magnetic head 1 shown in FIG. 10, since all of the inner walls (the first, second, third and fourth inner walls 30a, 30b, 30c and 30d) are provided with projections, the flow of the molten glass becomes easy to be controlled.

However, when all of the inner walls (the first, second, third and fourth inner walls 30a, 30b, 30c and 30d) are provided with projections, as to the positioning of the front core 8 within the hole 5, the circumstance becomes the same as the one in the case of the magnetic head 1 shown in FIGS. 5–8, and thereby, it is not determined to solve the problem appropriately.

SUMMARY OF THE INVENTION

In the light of the foregoing circumstances, the present invention has been made, wherein the purpose is to provide a magnetic head which is positioned preferably due to the head core at the time when it is sealed with material such as glass within the hole.

The invention is characterized in that a magnetic head comprises a slider having rail portions sliding on a magnetic writing medium, an approximately rectangular hole formed on the rail portions of the slider and a head core having an operation gap, one portion of which is inserted and sealed in the hole, wherein the height of the projections which are formed on two adjacent inner walls of the four inner walls is set lower as compared with the opposite two adjacent projections of other two inner walls.

The invention is further characterized in that, projection is formed round in section and higher in the middle thereof, the height $H_1$ of the projections formed on two inner walls of one side and the height $H_2$ of the projections formed on two inner walls of the other side are arranged to satisfy the following equation;

$$1.2 \times H_1 \leq H_2 \leq 5.0 \times H_1$$

BRIEF DESCRIPTION OF THE DRAWINGS

FIG. 2 is a perspective view showing the assembled state of the magnetic head of FIG. 1.

DETAILED DESCRIPTION OF PREFERRED EMBODIMENTS

Hereinafter one embodiment of a magnetic head of the present invention will be explained based on FIGS. 1–4. For reference, the names of members and parts same to the ones used in FIGS. 5–10 are omitted appropriately in explanation or in drawings.

Figure 10:
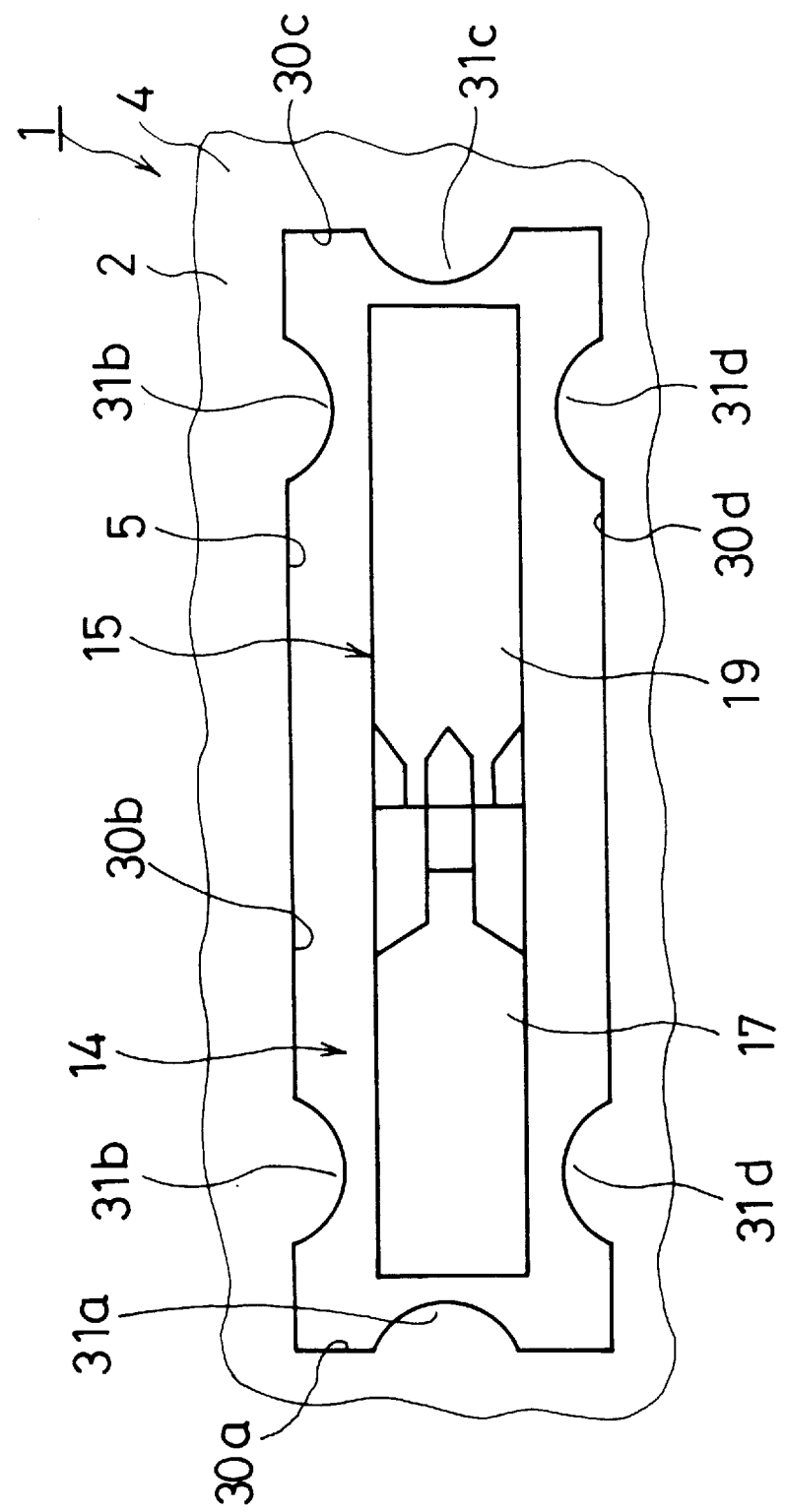
FIG. 10 is a plan view showing still another conventional example of a magnetic head.

In the magnetic head 1 of this embodiment, compared with the magnetic head 1 shown in FIG. 10, it is mainly different that, as shown in FIGS. 1–4 (in particular in FIG. 4), the height $H_1$ of the projections (the first and fourth projections 31a, 31d) formed on the adjacent inner walls 30a, 30d (two inner walls of one side) is set lower than the height $H_2$ ($H_1 < H_2$) of the projections (the second and third projections 31b, 31c) formed on the second, the third inner walls 30a, 30c (two inner walls of other side). For reference, the projections (the first, second, third and fourth projections 31a, 31b, 31c and 31d) are round in section and higher in the middle thereof.

In this magnetic head 1, in the hole 5 of the slider 4, a front core (head core body) 8 which forms a portion of a head core 9 is inserted and sealed with a glass of low melting point (hereinafter referred as "low melting point glass") as a kind of adhesive.

In this case, as to the height $H_1$ and $H_2$ of afore-mentioned projections, based on the following data, the relation thereof is set in such a manner as satisfying the following equation (1);

$$1.2 \times H_1 \leq H_2 \leq 5.0 \times H_1 \tag{1}$$

The applicant of the present application has gotten the result that the difference of the surface tension between the low melting point glass of the first, fourth inner walls 30a, 30d and the low melting point glass of the second, third inner walls 30b, 30c becomes small by making the height $H_2$ smaller than than 1.2 times of the height $H_1$. of the projection ($1.2 \times H_1 > H_2$). Further, the applicant has gotten the data that, as to the difference between the gap $G_{1\,4}$, that is between the first and fourth inner walls 30a, 30d and the front core 8, and the gap $G_{2\,3}$, that is between the second and third inner walls 30b, 30c and the front core 8, in other word the uniformity of the flow of the low melting point glass, when the height $H_2$ of the projection is larger than 5 times of the height $H_1$ of the projection ($H_2 > 5.0 \times H_1$), the difference between the gaps $G_{1\,4}$ and $G_{2\,3}$ becomes large and the low melting point glass does not flow evenly. According to the thus constructed magnetic head 1, since the height $H_1$ of the projections (the first and fourth projections 31a, 31d) formed on the first and fourth inner walls 30a, 30d is set lower than the height $H_2$ ($H_1 < H_2$) of the projections (the second and third projections 31b, 31b) formed on the second and third inner walls 30b, 30c, the low melting point glass flows in the gap $G_{2\,3}$ in the amount greater than the gap $G_{1\,4}$. Thereby, the surface tension of the low melting point glass of the side of the first and fourth inner walls 30a and 30d becomes larger than the surface tension of the second and third inner walls 30b and 30c. As a result, the front core 8 becomes equal to the side of the first and fourth inner walls 30a and 30d due to the attraction of the first and fourth inner walls 30a and 30d to be positioned appropriately.

Figure 9:
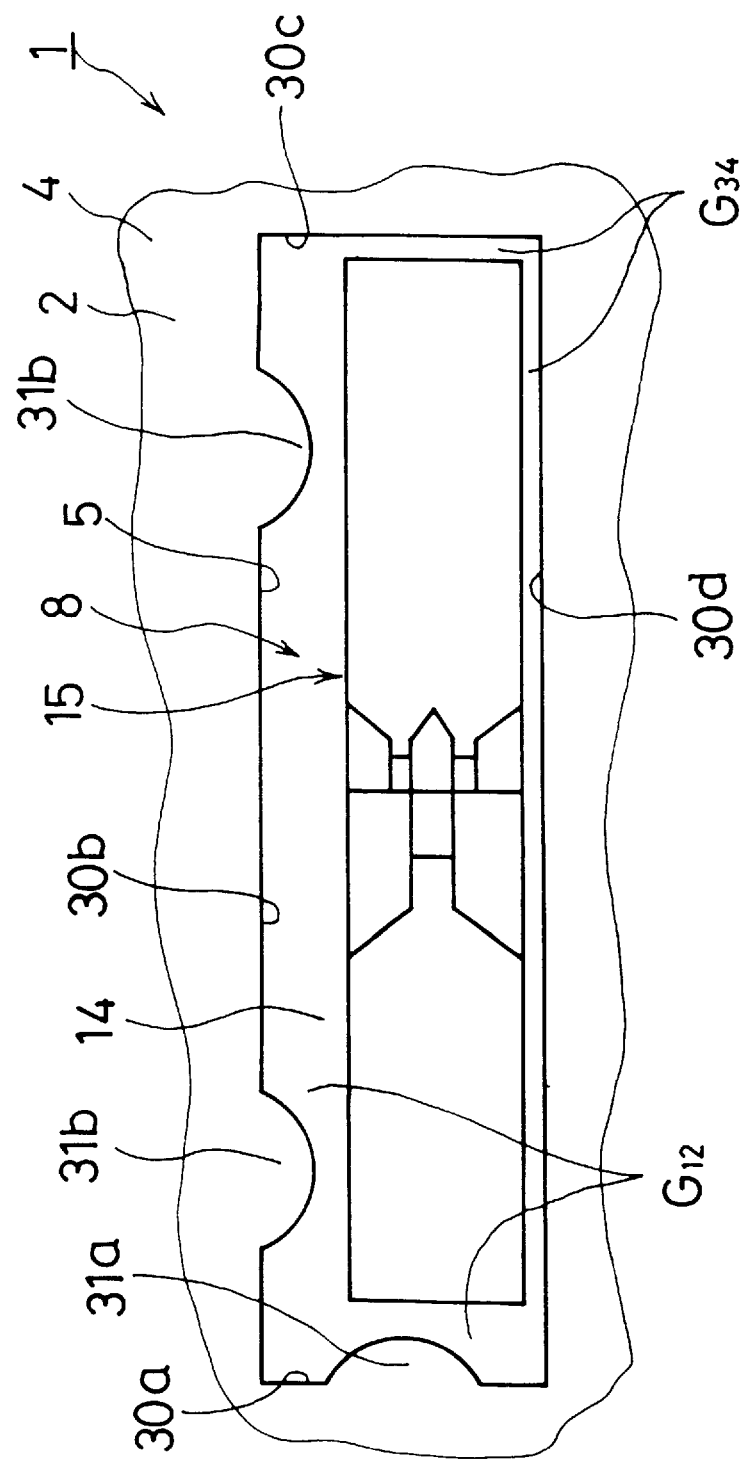
FIG. 9 is a plan view showing another conventional example of a magnetic head.

Further, in this case, since the projections (the first and fourth projection 31a, 31d) are provided on the first and fourth inner walls 30a, 30d, so that a given size of gap $G_{1\ 4}$ is secured between the first and fourth inner walls 30a and 30d and the front core 8, the low melting glass flows appropriately in the gap $G_{1\ 4}$ and the afore-mentioned conventional problem such as of FIG. 9 (glass does not flow since a gap is not secured between the inner wall and the front core) is not generated.

Still further, since the height $H_2$ of the projection is set more than 1.2 times ($1.2 \times H_1 \leq H_2$) of the height $H_1$ of the projection, the difference of the surface tension between the low melting point glass in the gap $G_{1\ 4}$ and the low melting glass in the gap $G_{2\ 3}$ a becomes larger, thereby the front core is attracted toward the first and fourth inner walls 30a and 30d and positioned appropriately.

In addition, since the height $H_2$ of the projection is set in such a manner as it becomes lower than 5 times of the height $H_1$ of the projection ($H_2 \leq 5.0 \times H_1$), the difference between the gaps $G_{1\ 4}$ and $G_{2\ 3}$ becomes small, the low melting glass flows even into the gaps $G_{1\ 4}$ and $G_{2\ 3}$. The problem which is generated in the magnetic head 1 of FIG. 9 (glass does not flow even in the gap between the third and fourth inner wall 30c and 30d and the front core 8) is not generated.

Figure 1:
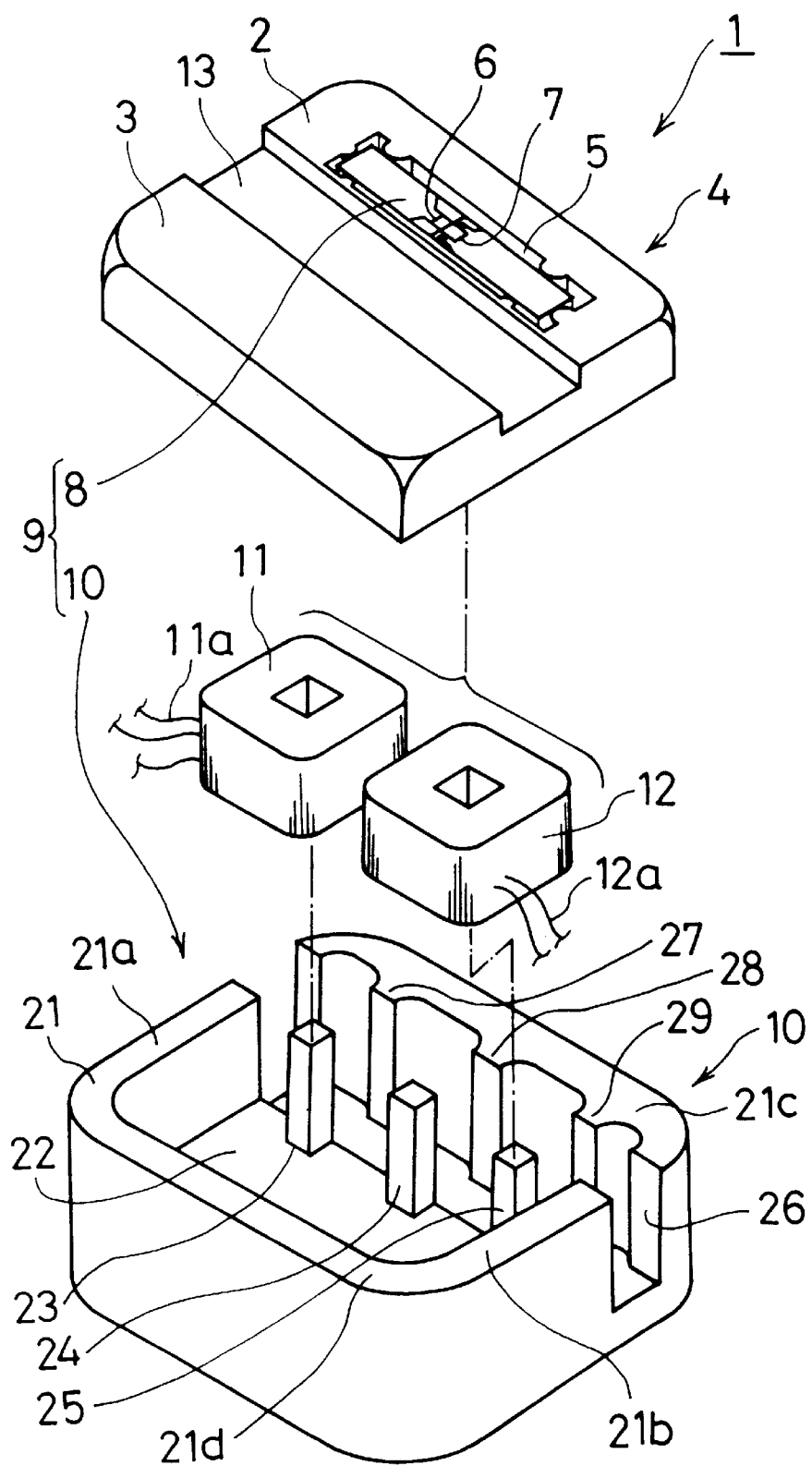
FIG. 1 is a fragmental perspective view showing an embodiment of a magnetic head according to the present invention.
Figure 3:
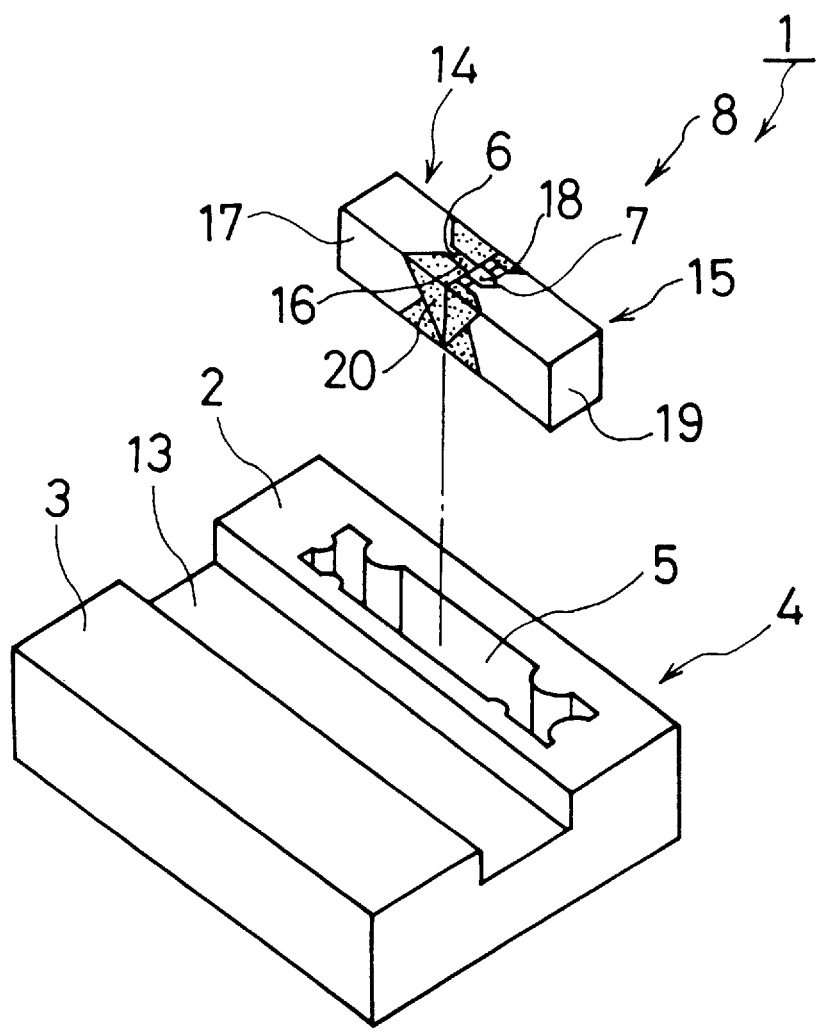
FIG. 3 is a fragmental perspective view of the slider and the front core of FIG. 1.
Figure 4:
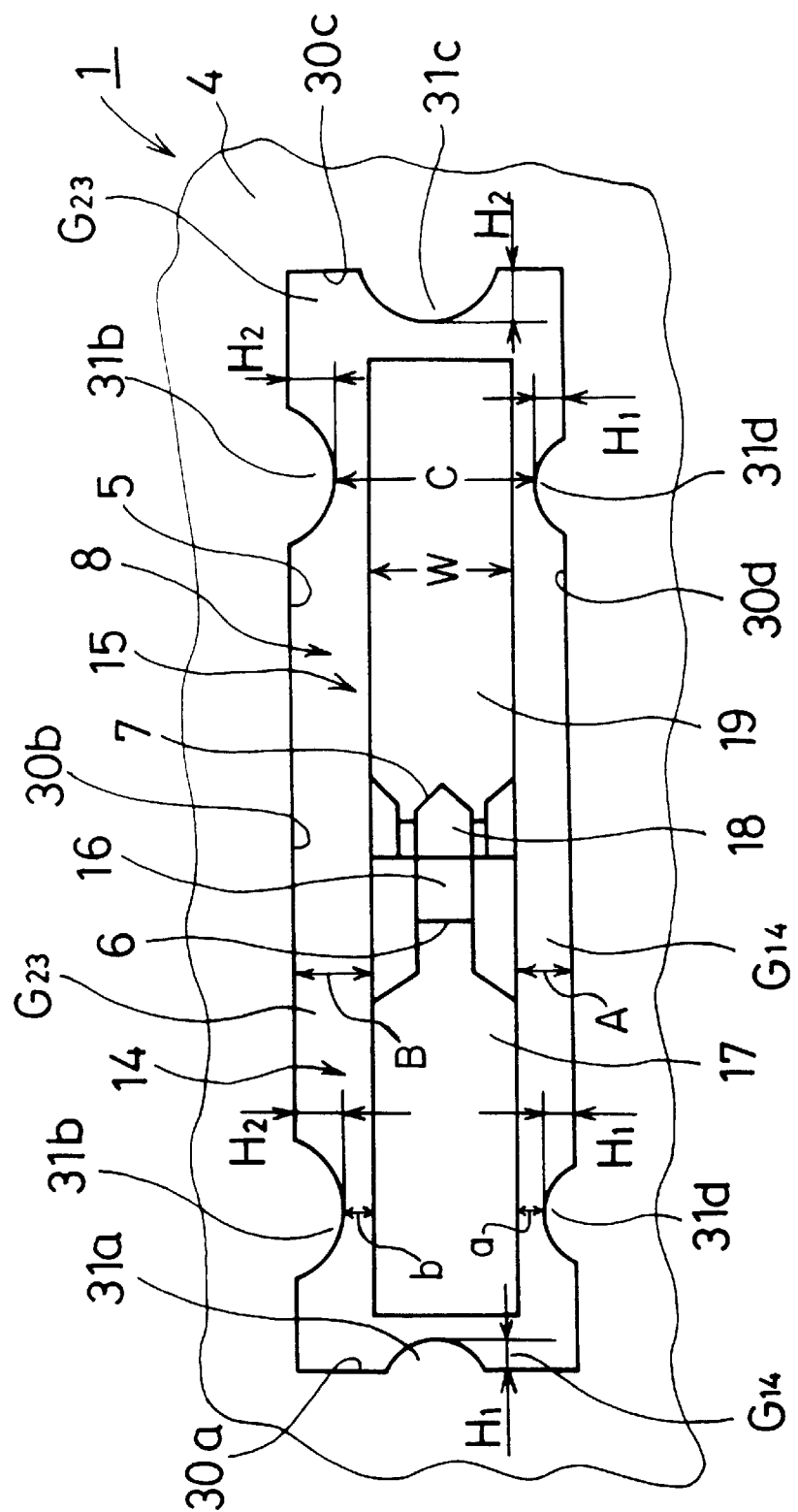
FIG. 4 is a plan view of the slider and the front core of FIG. 1.
Figure 5:
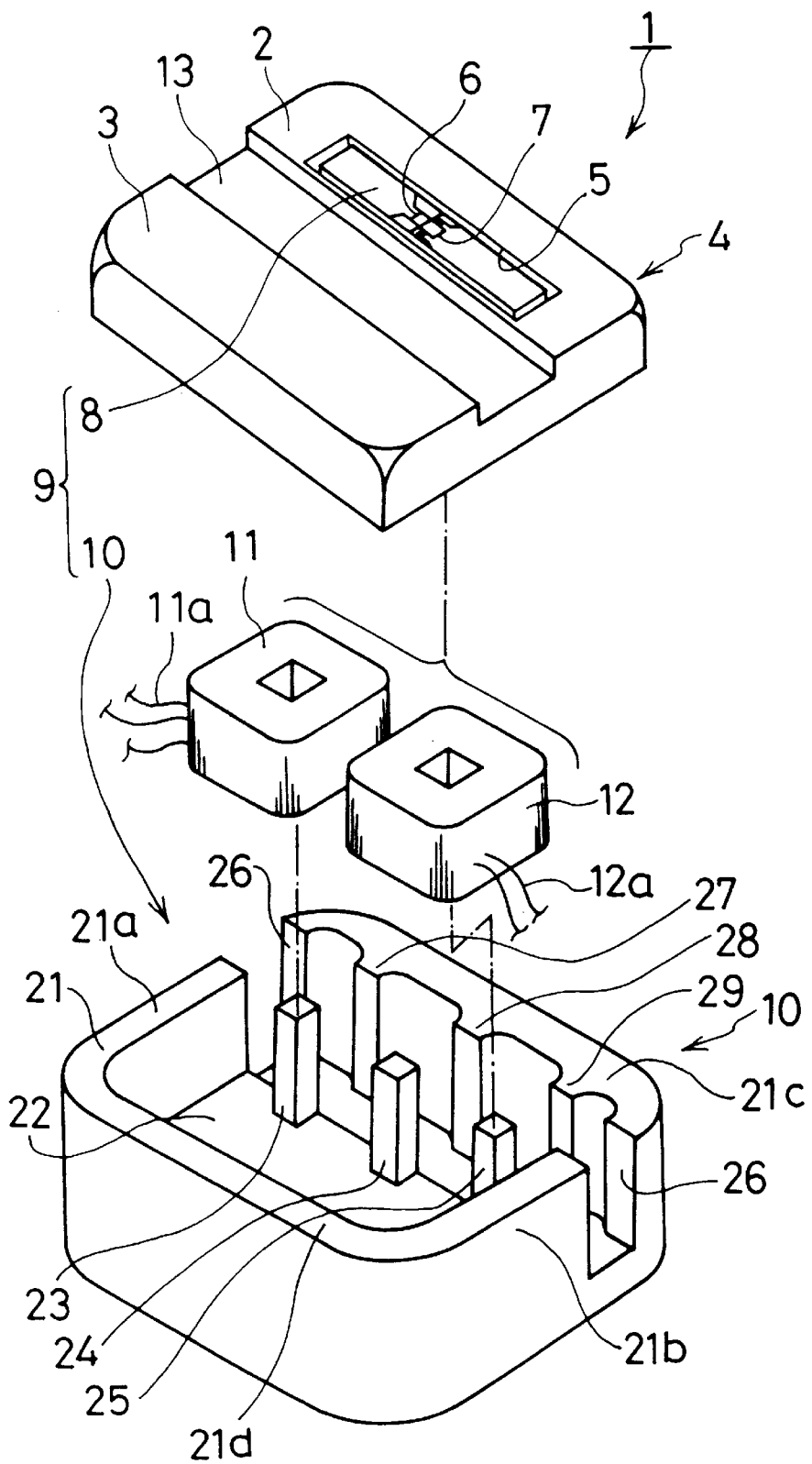
FIG. 5 is an example of a fragmental perspective view of a conventional magnetic head.
Figure 6:
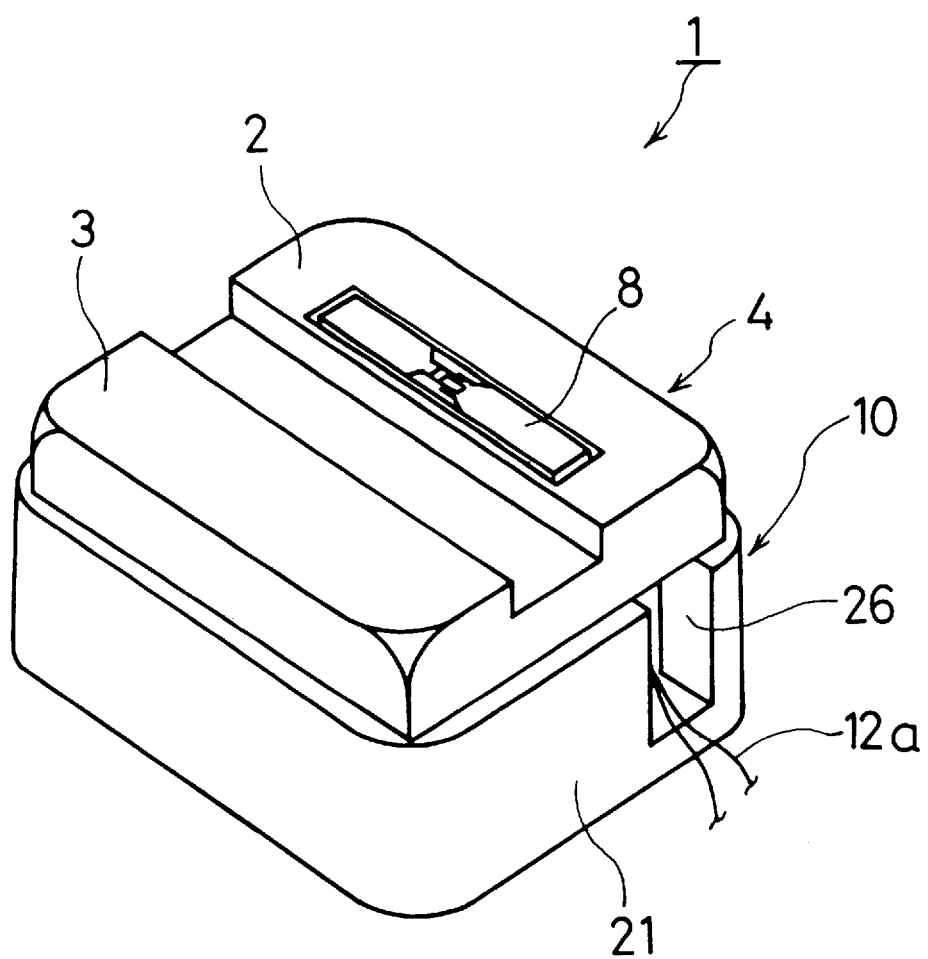
FIG. 6 is a perspective view of the assembled state of the magnetic head of FIG. 5.
Figure 7:
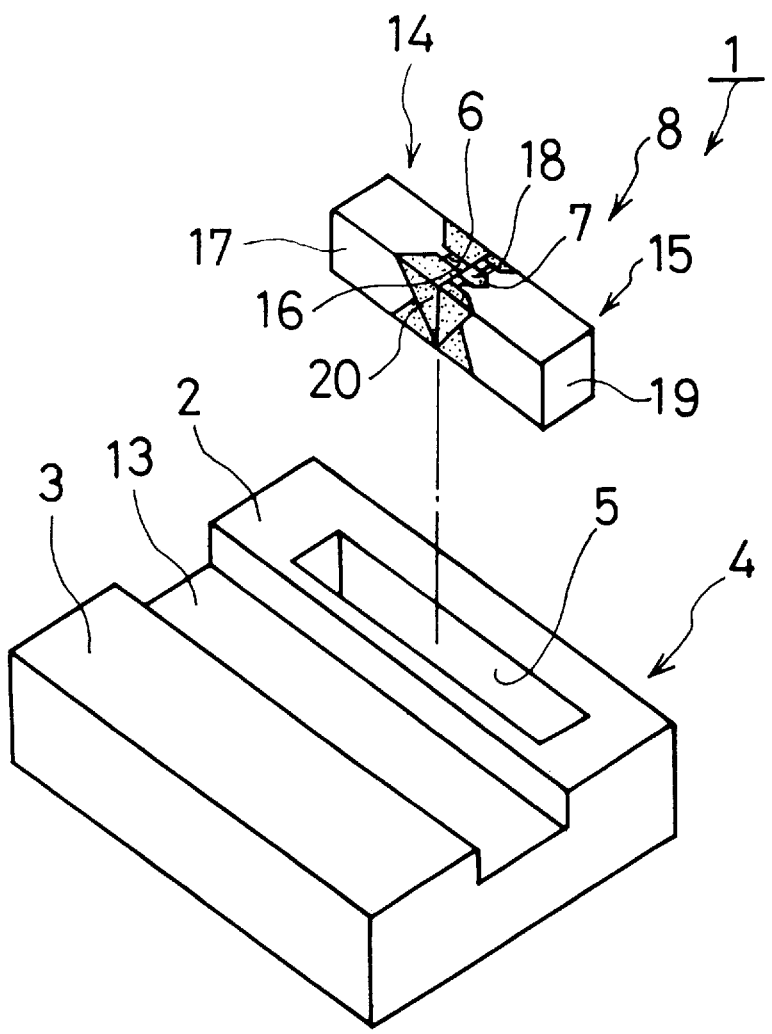
FIG. 7 is a fragmental perspective view of the slider and the front core of FIG. 5.
Figure 8:
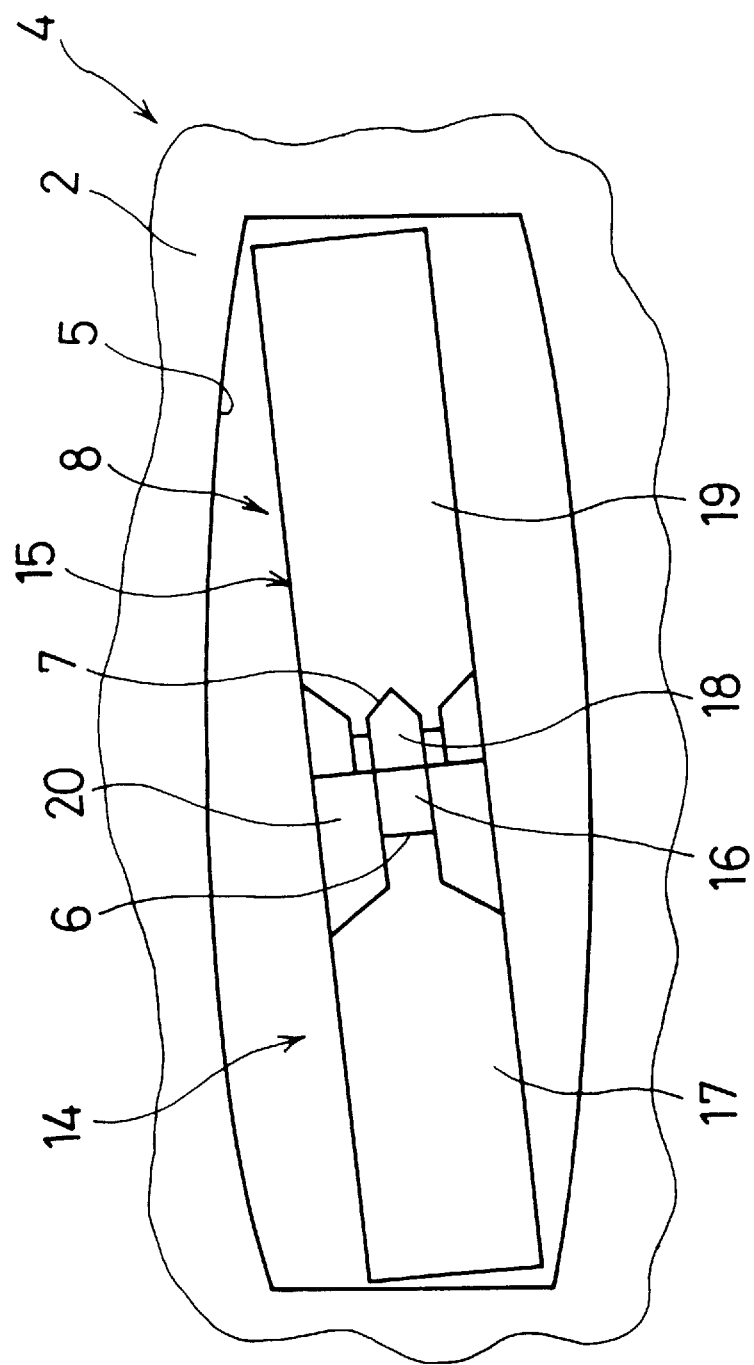
FIG. 8 is a plan view for explanation of the problems which the slider and the front core of FIG. 5 have.

As shown in FIG. 4, the head core body has a width w in a dimension between the inner side wall 30b and the inner side wall 30d. The head core body is spaced from the inner side wall 30d by a distance A, and is spaced from the inner side wall 30b by a distance B. As shown, B is greater than A. Also, the projections 31b on the inner side wall 30b are spaced from the head core body by a distance a, the projections 31d on the inner side wall 30d are spaced from the head core body by a distance b, and the projections 31d are spaced from the projections 31b by a distance C. As the projections 31b have a height $H_2$ and the projections 31d have a height $H_1$, the projections 31b extend inwardly from the inner side wall 30b toward the head core body a greater distance than the projections 31d extend from the inner side wall 30d.

As stated, B>A. Even assuming that b=0, then a=C−w. Because B>A, then $H_2 > H_1 + a$. Substituting a=C−w, then $H_2 > H_1 + C - w$. Therefore, $H_2 - H_1 > C - w$.

Although, in the above embodiment, a case where the height $H_1$ of the projections formed on the first and fourth inner walls 30a, 30d (two inner walls of one side) is set lower than the height $H_2$ of the projections of the second ($H_1 < H_2$), third inner walls 30b, 30c (two inner walls of another side) is exemplified, in place of it, a case where the height formed in the third and fourth inner walls 30c, 30d (two inner walls of one side) is set lower than the height formed in the the first, second inner walls 30a, 30b (two inner walls of another side) may be constituted.

Further, in the above embodiment, although a case where a stripe of projection (the first and third projections 31a, 31d) is provided on the first, third inner walls 30a, 30d, is exemplified, the number of the projections is not limited to this embodiment, for example, a case where projections of more than two may be provided on the first and third inner walls 30a, 30c or, a stripe of projection or projections more than three on the second and fourth inner walls 30b, 30d may be provided.

Still further, in the above embodiment, although a case where the projections (the first, second, third and fourth projections 31a, 31b, 31c and 31d) are extended in the direction longitudinal to the hole 5 (vertical direction to the paper of FIG. 4) is exemplified, in place of it, the direction of the projections may be in the direction perpendicular to the longitudinal direction of the hole 5 (right to left direction or upper to lower direction of FIG. 4), or may be in a hemispherical shape in section. In this case also, the number of projection is not limited to one stripe or two (one piece or two).

In the above embodiment, as a sealing agent, a low melting glass is exemplified, but in place thereof, a resin sealing agent such as an epoxy resin can be used.

As the effects of the present invention, the followings are mentioned.

According to the invention, projections are provided on the inner walls which form a hole, the height of a projection formed on the adjacent inner wall of one side is set lower than the height of the projection formed on the inner wall of another side, and since the sealing agent flows largely in the space between the inner walls and the head core body positioned on another side compared with the space between the inner walls and the head core body positioned on one side, so that the surface tension of the sealing agent of the inner walls of one side becomes large compared with the surface tension of the sealing agent of the inner walls of another side. Thereby, the head core body is attracted by the inner walls of one side, becomes equal to the inner wall on one side and is positioned appropriately. Further, since projections are provided on the inner walls of one side and a given gap is secured between the inner walls of one side and the head core body, the sealing agent flows there appropriately, there is not generated the problem which can be generated in the conventional art where the gap between the inner wall and the head core body is not secured, in which the glass does not flow appropriately.

According to the invention since the height $H_2$ of the projection formed on another side inner wall is set more than 1.2 times of the height $H_1$ of the other projection ($1.2 \times H_1 \leq H_2$), the difference of the surface of the sealing agent of the inner walls of between one side and another side becomes large, the head core body is attracted by the surface tension easily and positioned appropriately on the inner wall of one side.

Further, since the height $H_2$ of the projection of the inner walls on another side is set lower than 5 times of the height $H_1$ of the projection of the inner wall of one side ($H_2 \leq 5.0 \times H_1$), the difference between the gap between the inner wall on one side and the head core body, and the gap between the inner wall on another side and the core body becomes small, so that the glass flows evenly.

What is claimed is:

1. A magnetic head, comprising:

a slider including rail portions for sliding on a magnetic medium, one of the rail portions including a first inner side wall, a second inner side wall opposing the first inner side wall, a first inner end wall, and a second inner end wall opposing the first inner end wall, and the first and second inner side walls and the first and second inner end walls defining a rectangular hole;

a head core body having magnetic gaps, the head core body being sealed in the rectangular hole with a sealing agent; and at least one first projection formed on the first inner side wall;

at least one second projection formed on the second inner side wall;

at least one first projection formed on the first inner end wall; and at least one second projection formed on the second inner end wall;

wherein the first projections have a first height and the second projections have a second height which exceeds the first height such that the second projections extend inwardly toward the head core body a greater distance than the first projections; and wherein each of the first and second projections are spaced from the head core body.

2. The magnetic head of claim 1, wherein the first projections have a height $H_1$ and the second projections have a height $H_2$ that satisfy the equation:

$$1.2 \times H_1 \leq H_2 \leq 5.0 \times H_1$$

3. The magnetic head of claim 1, wherein the first and second projections (i) extend longitudinally in a first direction, and (ii) have a round sectional shape in a plane perpendicular to the first direction.

4. The magnetic head of claim 1, comprising at least two first projections on the first inner side wall, and at least two second projections on the second inner side wall.

5. The magnetic head of claim 1, wherein the first inner side wall and the second inner end wall are spaced from the head core body by a first gap, and the second inner side wall and the first inner end wall are spaced from the head core body by a second gap which is different than the first gap.

6. A magnetic head, comprising:

a slider including rail portions for sliding on a magnetic medium, one of the rail portions including a first inner side wall, a second inner side wall opposing the first inner side wall, a first inner end wall, and a second inner end wall opposing the first inner end wall, and the first and second inner side walls and the first and second inner end walls defining a rectangular hole;

a head core body having magnetic gaps, the head core body being sealed in the rectangular hole with a sealing agent; and at least one first projection formed on the first inner side wall;

at least one second projection formed on the second inner side wall;

at least one first projection formed on the first inner end wall; and at least one second projection formed on the second inner end wall;

wherein the first projections have a first height and the second projections have a second height which exceeds the first height such that the second projections extend inwardly toward the head core body a greater distance than the first projections;

wherein the first inner side wall and the second inner end wall are spaced from the head core body by a first gap, and the second inner side wall and the first inner end wall are spaced from the head core body by a second gap which is different than the first gap; and wherein the first projections have a height $H_1$ and the second projections have a height $H_2$ that satisfy the equation:

$$1.2 \times H_1 \leq H_2 \leq 5.0 \times H_1$$

7. The magnetic head of claim 6, wherein the first and second projections (i) extend longitudinally in a first direction, and (ii) have a round sectional shape in a plane perpendicular to the first direction.

8. The magnetic head of claim 6, comprising at least two first projections on the first inner side wall, and at least two second projections on the second inner side wall.

9. A magnetic head, comprising:

a slider including rail portions for sliding on a magnetic medium, one of the rail portions including a first inner side wall, a second inner side wall opposing the first inner side wall, a first inner end wall, and a second inner end wall opposing the first inner end wall, and the first and second inner side walls and the first and second inner end walls defining a rectangular hole;

a head core body having magnetic gaps, the head core body being sealed in the rectangular hole with a sealing agent, the head core body (i) having a width w in a dimension between the first inner side wall and the second inner side wall, (ii) being spaced from the first inner side wall by a distance A, and (iii) being spaced from the second inner side wall by a distance B which is greater than the distance A; and at least two first projections formed on the first inner side wall, the first projections (i) having a first height $H_1$, and (ii) being spaced from the head core body by a distance a;

at least two second projections formed on the second inner side wall, the second projections (i) having a second height $H_2$, (ii) being spaced from the head core body by a distance b, and (iii) being spaced from the first projections on the first inner side wall by a distance C;

at least one first projection formed on the first inner end wall and being spaced from the head core body; and at least one second projection formed on the second inner end wall and being spaced from the head core body;

wherein $H_2 > H_1$ such that the second projections extend inwardly toward the head core body a greater distance than the first projections; and wherein the following inequality is satisified:

$$H_2 \times H_1 > C - w.$$

* * * * *